Sept. 2, 1969   R. D. COPLEY ET AL   3,464,191
DISCHARGE STRUCTURE FOR COTTON HARVESTER
Filed Dec. 9, 1966

INVENTOR.
RUSSELL D. COPLEY &
GAIL R. SUTHERLAND
BY William A. Murray ly along the line 4—4 of FIG. 3 while also showing a sectional view of the blower.

United States Patent Office 3,464,191
Patented Sept. 2, 1969

3,464,191
DISCHARGE STRUCTURE FOR COTTON HARVESTER
Russell Dean Copley, Ankeny, and Gail Russell Sutherland, Des Moines, Iowa, assignors to Deere & Company, Moline, Ill., a corporation of Delaware
Filed Dec. 9, 1966, Ser. No. 600,523
Int. Cl. A01d 45/20
U.S. Cl. 56—12                                      9 Claims

ABSTRACT OF THE DISCLOSURE

A compartment adapted to be supported on the rear central side of a cotton picker housing structure and centrally between a pair of transversely spaced plant passages in the housing structure, upright harvesting mechanism disposed within the housing structure and adapted to harvest cotton from adjacent rows of plants moving through the respective passages and for discharging the cotton into the centrally located compartment, the compartment being characterized by having an upright transverse plate extending across the compartment and blocking passage of cotton directly into the compartment by deflecting it downwardly to a lower transverse horizontal edge of the panel spaced from the floor of the compartment whereby the cotton will move into the rear portion of the compartment via an opening between the lower transverse edge and the floor, and blower means having a blower outlet directed into the rear portion of the compartment and positioned above the lower transverse edge whereby the air will move into and be deflected upwardly through an outlet at the top of the compartment.

BACKGROUND OF THE INVENTION

The invention pertains to a cotton harvester and more particularly to the type of cotton harvester that utilizes an uprigh harvester housing with a pair of transversely spaced fore-and-aft extending plant passages that receive adjacent rows of cotton plants. Still more particularly the invention pertains to an upright cotton-receiving compartment that is centrally positioned between the adjacent rows of plants and is supported on the rearward side of the housing. The invention also relates to blower means and its blower outlet that is connected to the compartment and directs cotton and air upwardly through an outlet on the upper portion of the compartment.

It has heretofore been known to provide compartments on the rear central sides of cotton harvesters that are positioned inwardly of adjacent rows of cotton plants, such being shown, for example, in U.S. Patent 3,088,262 which issued May 7, 1963 to Mr. Karl I. Graham. It has also been known to provide a single compartment rearwardly of the housing structure that is adapted to receive cotton from a pair of upright harvesting drums and their associated harvesting mechanisms that are positioned inwardly of a pair of adjacent rows of cotton plants, such being shown in U.S. Patent 2,986,861 which issued to Mr. A. L. Hubbard on June 6, 1961. However, common to the structures of both the Hubbard and Graham designs has been a blower or fan that has its intake side connected to the compartment to suck or draw the cotton along with air into the fan or blower and from thence into the picker container or basket. In such an arrangement, the cotton passing through the blower will often become soiled due to the blades of the fan breaking or cracking the cotton seed within the boll.

SUMMARY

In the present invention there is provided an upright compartment structure supported on the housing structure and adapted to receive cotton through the opening at the rear central portion of the housing structure. The compartment has a pair of upright fore-and-aft extending side walls and a transverse upright panel that extends across and is connected to the side walls so as to divide the compartment into front and rear sections. The transverse panel has a lower edge spaced upwardly from the floor of the compartment so that material moving through the central opening of the housing structure will strike the panel and descend to the opening beneath the lower edge of the transverse panel. The rear portion of the compartment has a blower inlet opening that receives air from a blower so that the air is directed upwardly through a discharge outlet at the top of the compartment. The entrance of air into the rear portion of the compartment is above the lower transverse edge of the transverse panel and consequently there is not a direct traverse of the air across cotton moving into the compartment. Rather, the air being directed upwardly by the blower in a rear portion of the compartment creates a draft in the lower portion of the compartment and through the opening beneath the lower transverse edge of the panel which causes the relatively ripe and light-weight cotton bolls to be drawn upwardly away from the trash and green cotton bolls at the base of the compartment. A blower duct is provided from the outlet of the compartment to the picker basket. Consequently the cotton moving through the compartment never passes directly through the blower.

DESCRIPTION OF THE PREFERRED EMBODIMENT

Figure 1:
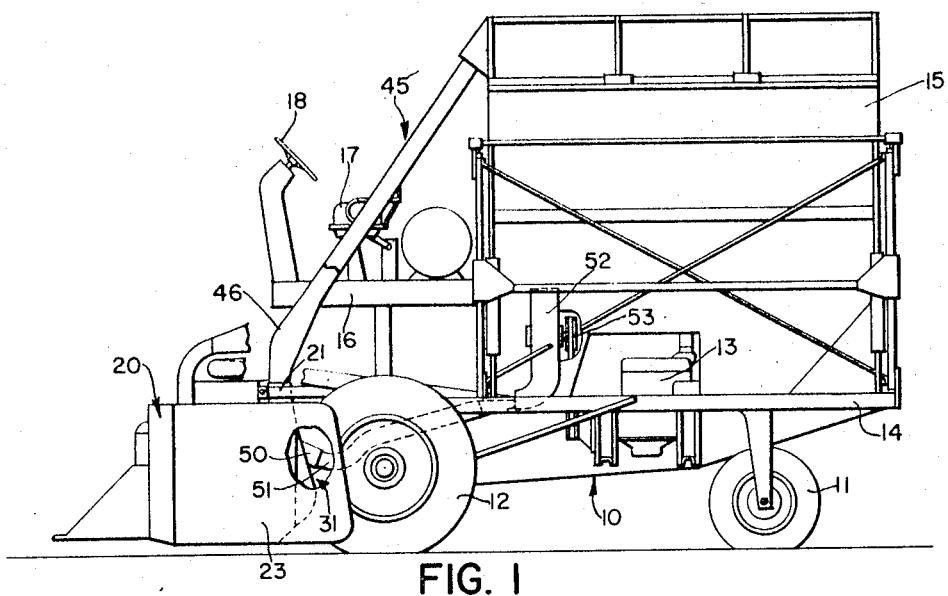
FIG. 1 is a side view of a cotton harvester, with portions broken away, incorporating the structure of the present invention.

A cotton harvester as shown in FIG. 1 may be basically of the type shown in U.S. Patent 3,088,262 which issued to Mr. K. I. Graham on May 7, 1963, with the exception of the means for moving the harvested cotton between the basic harvesting units and the basket or container. The cotton harvester is composed of a main mobile vehicle 10 having rear steerable wheels 11 and front traction wheels 12. The vehicle has a main power unit or engine 13 and a main frame 14 that supports a cotton container or basket 15 and a front or forward positioned operator's platform 16 having a seat 17, steering mechanism 18, and other suitable controls, not shown, by which the entire harvester is operated. Supported on the forward end of the vehicle 10 are harvesting units 20. The harvesting units 20 are constructed and arranged in the manner shown and described in the aforementioned Graham patent with the exception of a discharge means which will presently be described. The units 20 are supported on lift arms 21 that are raised and lowered by suitable hydraulic means, not shown.

The harvesting units 20 include an upright housing structure that extends across the transverse expanse of the vehicle 10 and has structure therein defining a pair of transversely spaced plant passages 24, 25 that receive and permit passage of a pair of adjacent rows of plants. Supported in the housing structure 23 are upright harvesting drums 26, 27 having laterally extending spindles that extend into the respective passages 24, 25 for the purpose of dislodging the cotton bolls from the plants. The drums 26, 27 carry the detached cotton bolls inwardly from the passages to upright doffing mechanisms 28, 29 that serve, in conventional manner, to remove the cotton bolls from the spindles and discharge them centrally and rearwardly through opening means on the rear central side of the housing structure 23. The doffing drums 28, 29 are so positioned to discharge the cotton in a rearward direction through the rear upright wall structure 30 of the housing 23 and in a central rearward location.

Supported on the rear wall structure of the housing 23 is an upright compartment structure 31 that is centrally positioned and adapted to receive the cotton moving from the doffing drums 28, 29. The compartment 31 is composed of a pair of upright side wall panels 32, 33 that diverge from relatively closely spaced rear portions forwardly to relatively widely spaced front upright flanges 34, 35. The flanges 34, 35 are spaced apart, to define a forward opening that opens into the housing 23 at the rear sides of the respective drums 28, 29. The compartment 31 generally closes the rear opening means of the upright housing 23. The compartment structure 31 further includes a rear upright panel 36 that extends downwardly from an upper end to a lower portion and then curves forwardly in a continuing floor portion 37 to a lower forward end 38 that is connected to the floor of the housing 23. The wall portions 36, 37 interjoin the side panels 32, 33.

Figures 2, 4:
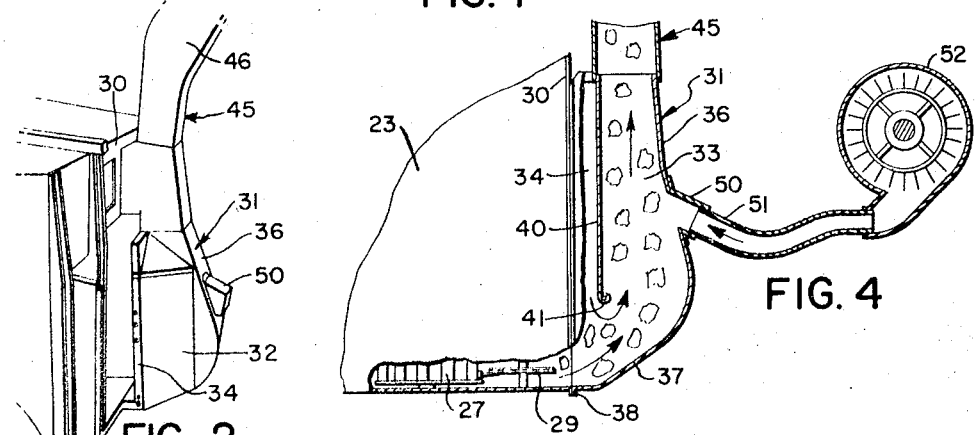
FIG. 2 is a rear and side perspective view of the central rear portion of the harvester.
FIG. 4 is an enlarged sectional view taken substantially along the line 4—4 of FIG. 3 while also showing a sectional view of the blower.
Figure 3:
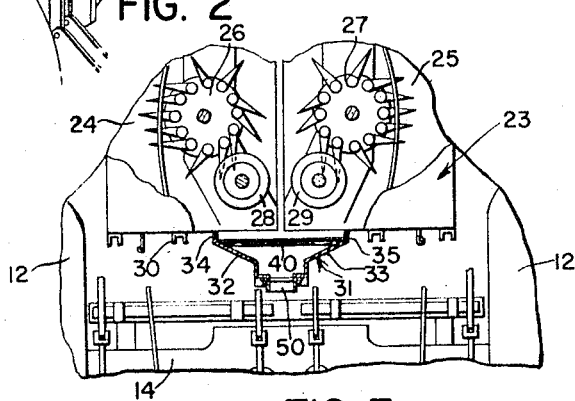
FIG. 3 is a plan view, with portions broken away, of a central portion of the housing structure.

A forwardly positioned upright transverse panel 40 extends across and interconnects the side panels 32, 33 and is spacedly forwardly of the rear panel 36. The panel 40 terminates in a lower transverse edge 41 spacedly upwardly from the floor panel 37. As may best be seen upon review of FIG. 4, the panel 40 is positioned to intercept the cotton being dispatched by the doffer drums 28, 29 to cause the cotton to gravitate to the lower edge 41 where it may be passed into the rear portion of the compartment 31 through an opening defined by the edge 41, the floor 37, and the side walls 32, 33. The upper end of the panel 40 forms with the upper end of the panel 36 and the upper ends of the side panels 32, 33 a discharge outlet that receives the lower end of a blower duct system 45, the duct system extending from an elbow 46 upwardly and rearwardly to an entrance in the upper forward end of the basket or container 15.

The rear panel 36 supports thereon an inclined air inlet 50 that projects rearwardly and downwardly and receives a discharge outlet 51 that is connected to a main blower or fan 52 that is supported on the main frame 14 and is driven through suitable drive means 53 by the engine 13. The blower discharge duct or outlet 51 is composed of flexible material so that the duct may be adjusted around various structural members of the harvester. The inlet 50 as well as the terminal end of the discharge duct 51 is positioned above the lower edge 41 of the transverse panel 40. Consequently, air moving through the duct 51 and into the rear portion of the compartment will be deflected upwardly through the upper discharge portion of the compartment 31.

In operation, cotton is discharged by the doffing drums 28, 29 into the forward part of the compartment 31 and from thence downwardly through the opening beneath the transverse edge 41. The blower 52 introduces air under some pressure into the rear portion of the compartment 31 and since it is introduced in the compartment in an upwardly and forwardly inclined manner, it departs the compartment via the upper opening of the compartment. Since air in the upper portion of the compartment 31 is under some pressure, it creates an induced flow of air through the lower portion of the compartment or through the opening beneath the transverse edge 41. This latter flow of air causes the ripened cotton bolls to be picked up and moved into the rear portion of the compartment to flow upwardly past the inlet 50 where it is caught up in the blast of air issuing from the blower 52. The cotton is then moved upwardly and rearwardly through the discharge duct 45 into the basket 15. As may be seen, therefore, the cotton never moves through or in the vicinity of the blower 52 and consequently cannot be damaged by impingement upon the blower blades.

What is claimed is:

1. In a cotton picker having an upright housing structure with rear upright discharge opening means centrally located between a pair of plant passages, a harvesting mechanism therein for harvesting and moving cotton bolls through the discharge opening, the improvement comprising: an upright compartment structure supported on the housing structure rearwardly of the opening means and opening forwardly to receive cotton through the opening means, the compartment having a pair of upright fore-and-aft extending and transversely spaced wall panels extending rearwardly from front upright edges adjacent opposite sides of the opening means, and an interconnecting wall panel extending between and interjoining the rear portions of the transversely spaced panels including a rear upright portion extending from its upper end downwardly to a forwardly continuing floor portion having a lower forward end adjacent the lower side of the opening means; a discharge duct connected to the upper ends of the transversely spaced and interconnecting panels for receiving material from the compartment; and blower means including a blower outlet opening into the compartment above the floor portion and through at least one of the panels, the outlet directing a stream of air upwardly through the discharge duct.

2. The structure as set forth in claim 1 further characterized by a transverse upright panel means extending across and blocking material from entering the upper portions of the compartment, the panel means being positioned forwardly of the interconnecting panel and terminating at a lower edge positioned above the floor portion whereby cotton moving toward the opening means will strike said transverse panel means and gravitate downwardly to the opening defined by the floor portion and the lower transverse edge.

3. The structure as set forth in claim 2 further characterized by the lower transverse edge being at a level beneath the blower outlet.

4. The structure as set forth in claim 2 in which the transverse panel means is an upright panel having opposite upright edges fixed to the respective inner faces of the transversely spaced upright panels and in which the transverse panel is spacedly forwardly of the interconnecting panel, and the portion of the compartment rearwardly of the transverse panel defines with the transverse panel a downward continuation of the discharge duct.

5. The structure as set forth in claim 1 in which the blower outlet is connected to the interconnecting panel whereby the air is directed into the compartment in an upwardly and forwardly inclined path; and further characterized by the transverse upright panel positioned forwardly of the outlet and extending across the compartment whereby the air moving through the outlet will be guided in an upward path to the discharge duct.

6. The structure as set forth in claim 1 in which the harvesting mechanism is composed of a pair of upright harvesting drums having laterally extending spindles that extend into the respective plant passages, and upright doffing drums positioned rearwardly of the harvesting drums and forwardly of the opening means and which operate to remove cotton from the spindles and to drive the cotton through the discharge opening means; and further characterized by the transversely spaced upright panels converging inwardly and rearwardly from adjacent the respective doffing drums for guiding the cotton to a relatively narrow rear portion in the compartment.

7. The structure as set forth in claim 6 further characterized by an upright transverse panel extending between the transversely spaced upright panels and having a lower edge spaced from the floor portion for guiding cotton moving through the opening means downwardly to an inlet opening defined by the lower edge of the transverse upright panel and the floor portion.

8. In a cotton picker having an upright housing structure with an upright discharge opening, and harvesting mechanism therein for harvesting and moving cotton through the discharge opening, the improvement comprising: an upright compartment structure supported on the housing structure and opening into the housing structure to receive cotton through the opening, the compartment having a pair of spaced apart upright fore-and-aft extending side wall panels extending from upright edges adjacent opposite sides of the opening and an interjoining wall panel spaced outwardly of the opening and extending between and interjoining the side panels including an upright portion extending from its upper end downwardly to an inwardly continuing floor portion terminating adjacent the lower side of the opening; a panel extending across and connected to the respective side panels extending downwardly from an upper end at the upper portion of the compartment to a lower horizontal edge positioned above the floor portion and defining a material inlet at the base of the compartment, the latter panel defining with the side panels and the interconnecting panel an upright cotton passage terminating at a cotton discharge outlet in the upper side of the compartment; a blower duct connected to the outlet for receiving cotton from the compartment; and blower means including a blower outlet connected to at least one of the panels above said lower horizontal edge and directing a stream of air upwardly through the discharge duct.

9. The structure as set forth in claim 8 in which the blower outlet is connected to the interconnecting panel and directs a stream of air in an upwardly inclined path toward the panel that extends across and connects to the side panels whereby said air will move in a path upwardly through the discharge duct.

References Cited

UNITED STATES PATENTS

| | | | |
|---|---|---|---|
| 2,672,001 | 3/1954 | Bopf et al. | 56—14 |
| 2,741,888 | 4/1956 | Hamel et al. | 56—12 |
| 2,986,861 | 6/1961 | Hubbard | 56—41 |
| 3,031,828 | 5/1962 | Graham | 56—14 |
| 3,114,227 | 12/1963 | Morkoski et al. | 56—12 |
| 3,352,092 | 11/1967 | Hubbard | 56—12 |
| 3,372,535 | 3/1968 | McCunn et al. | 56—12 |

RUSSELL R. KINSEY, Primary Examiner